United States Patent
Takasaki et al.

(10) Patent No.: US 9,067,634 B2
(45) Date of Patent: Jun. 30, 2015

(54) MOTORCYCLE

(71) Applicant: HONDA MOTOR CO., LTD., Tokyo (JP)

(72) Inventors: Atsushi Takasaki, Wako (JP); Yotaro Mori, Wako (JP); Kineo Tomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/310,092

(22) Filed: Jun. 20, 2014

(65) Prior Publication Data
US 2015/0014079 A1 Jan. 15, 2015

(30) Foreign Application Priority Data
Jul. 10, 2013 (JP) ................................ 2013-144525

(51) Int. Cl.
*B62K 11/04* (2006.01)
*B62J 23/00* (2006.01)

(52) U.S. Cl.
CPC . *B62K 11/04* (2013.01); *B62J 23/00* (2013.01)

(58) Field of Classification Search
CPC .... B62K 11/00; B62K 11/04; B62K 2202/00; B62D 25/084; F02B 61/02
USPC ........................................ 180/68.4, 68.6, 229
See application file for complete search history.

(56) References Cited

U.S. PATENT DOCUMENTS

| | | | | | |
|---|---|---|---|---|---|
| 4,632,206 | A | * | 12/1986 | Morinaka et al. | 180/229 |
| 4,878,558 | A | * | 11/1989 | Asakura | 180/219 |
| 5,992,554 | A | * | 11/1999 | Hasumi et al. | 180/229 |
| 6,332,505 | B1 | * | 12/2001 | Tateshima et al. | 180/229 |
| 6,695,089 | B2 | * | 2/2004 | Adachi et al. | 180/311 |
| 7,448,461 | B2 | * | 11/2008 | Misaki et al. | 180/68.4 |
| 8,083,017 | B2 | * | 12/2011 | Arimura | 180/219 |
| 8,302,723 | B2 | * | 11/2012 | Mitomi et al. | 180/229 |
| 2002/0189878 | A1 | * | 12/2002 | Iimuro | 180/219 |
| 2008/0156566 | A1 | * | 7/2008 | Oohashi et al. | 180/229 |
| 2009/0255489 | A1 | * | 10/2009 | Fujiwara et al. | 123/41.57 |
| 2009/0266637 | A1 | * | 10/2009 | Miyashiro | 180/219 |
| 2011/0073063 | A1 | * | 3/2011 | Tadokoro et al. | 123/195 |
| 2013/0081896 | A1 | * | 4/2013 | Nakamura | 180/229 |

FOREIGN PATENT DOCUMENTS

JP 08-332982 A 12/1996

* cited by examiner

*Primary Examiner* — Joseph Rocca
*Assistant Examiner* — Marc A Scharich
(74) *Attorney, Agent, or Firm* — Westerman, Hattori, Daniels & Adrian, LLP

(57) ABSTRACT

A motorcycle is provided with a front fork cover which can suppress traveling resistance as much as possible while increasing a cooling effect of a radiator within a required range. A pair of radiators as viewed in a side view are arranged above a crankcase of an engine. A front fork is arranged over the radiators in the vertical direction as viewed in a side view. Upper surfaces of front fork covers arranged above lower ends of the radiators in the vertical direction extend toward the radiators, and lower surfaces of the front fork covers arranged below the lower ends of the radiators extend toward lateral sides of the crankcase extending to the outside more than the radiators.

9 Claims, 12 Drawing Sheets

MOTORCYCLE

CROSS-REFERENCE TO RELATED APPLICATIONS

The present application claims priority under 35 U.S.C. §119 to Japanese Patent Application No. 2013-144525, filed Jul. 10, 2013, the contents of which are incorporated herein, by reference, in their entirety.

TECHNICAL FIELD

The present invention relates to a motorcycle provided with a front fork cover which covers a lower portion of a front fork.

BACKGROUND OF THE INVENTION

Conventionally, there has been known a motorcycle where a front fork cover is mounted on a lower portion of a front fork thus imparting a flow straightening effect on the front fork cover (for example, see JP-A-8-332982).

In the invention described in JP-A-8-332982, as such a front fork cover, there is disclosed a front fork cover which positively guides traveling wind to a radiator arranged behind the front fork cover.

SUMMARY OF THE INVENTION

On the other hand, the guiding of traveling wind to the inside of a vehicle body increases traveling resistance and hence, fuel consumption or the like is also influenced by this guiding of the traveling wind.

A motorcycle is provided with a front fork cover which can suppress traveling resistance as much as possible while increasing a cooling effect of a radiator within a required range.

To overcome the above-mentioned drawbacks, the motorcycle includes: a main frame which extends rearward and downward from a head pipe; an engine which has a cylinder axis extending in a vertical direction and is arranged below the main frame; a radiator which is provided in front of the engine; a front fork which is supported on a steering shaft which is rotatably supported on the head pipe; and a front fork cover which covers a lower portion of the front fork. The radiator is arranged above a crankcase of the engine as viewed in a side view. The front fork is arranged over the radiator in a straddling manner in the vertical direction as viewed in a side view. An upper surface of the front fork cover arranged above a lower end of the radiator in the vertical direction extends toward the radiator. A lower surface of the front fork cover arranged below the lower end of the radiator extends toward a side of the crankcase extending to the outside more than the radiator.

In the above-mentioned constitution, the radiator may be formed of a pair of left and right radiators, and the motorcycle may include a down frame which extends rearward and downward from the head pipe below the main frame, and the radiators may be respectively arranged on left and right sides of the down frame.

In the above-mentioned constitution, the motorcycle may include a front lower cover which covers left and right front sides of the crankcase respectively, and a lower surface of the front fork cover may extend toward more outside than the front lower cover.

In the above-mentioned constitution, a fuel tank may be positioned on a side of the crankcase.

The radiator is arranged above the crankcase of the engine as viewed in a side view, the front fork is arranged so as to straddle the radiator in the vertical direction as viewed in a side view, the upper surface of the front fork cover arranged above the lower end of the radiator in the vertical direction extends toward the radiator, and the lower surface of the front fork cover arranged below the lower end of the radiator extends toward the side of the crankcase extending toward the outside of the radiator. Accordingly, traveling wind is guided to the radiator by the upper surface of the front cover and hence, a cooling effect of the radiator can be enhanced. At the same time, by making traveling wind flow toward the side of the crankcase by using the lower surface of the front fork cover, traveling resistance can be decreased. In this manner, while enabling both the enhancement of cooling property of the radiator and the reduction of traveling resistance, it is possible to prevent the increase in the number of parts or the like.

Further, the radiator is formed of the pair of left and right radiators, the motorcycle includes the down frame which extends rearward and downward from the head pipe below the main frame, and the radiators are arranged on left and right sides of the down frame respectively. Accordingly, traveling wind can be guided to the radiators arranged on left and right sides by the left and right front fork covers thus efficiently cooling the radiators.

The motorcycle includes the front lower cover which covers the left and right front sides of the crankcase respectively, and the lower surface of the front fork cover extends more outside than the front lower cover. Accordingly, it is possible to make it difficult for traveling wind to impinge on the vehicle body by using the front fork cover whereby traveling resistance can be further decreased.

The fuel tank is positioned on a side of the crankcase and hence, traveling wind is made to flow along the side of the fuel tank by the front fork cover thus cooling the fuel tank. Accordingly, evaporation of fuel can be suppressed.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, one embodiment of the invention is explained by reference to drawings. In the explanation made hereinafter, the expressions relating to directions such as "frontward", "rearward", "leftward", "rightward", "upward", and "downward" are identical with the directions with respect to a vehicle body unless otherwise specified. Further, in the respective drawings, symbol FR indicates "front side of the vehicle body", symbol UP indicates "upper side of the vehicle body", and symbol LE indicates "left side of the vehicle body".

Figure 1:
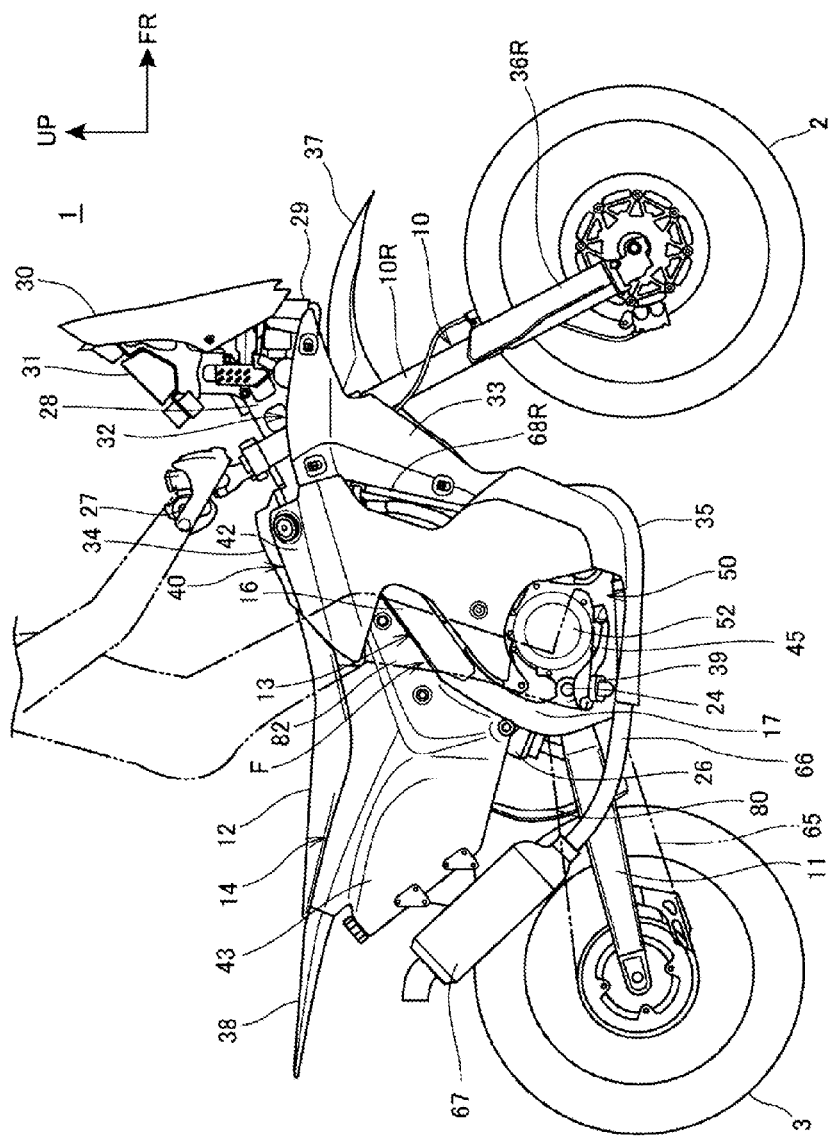
FIG. 1 is a right side view of a motorcycle.
Figure 2:
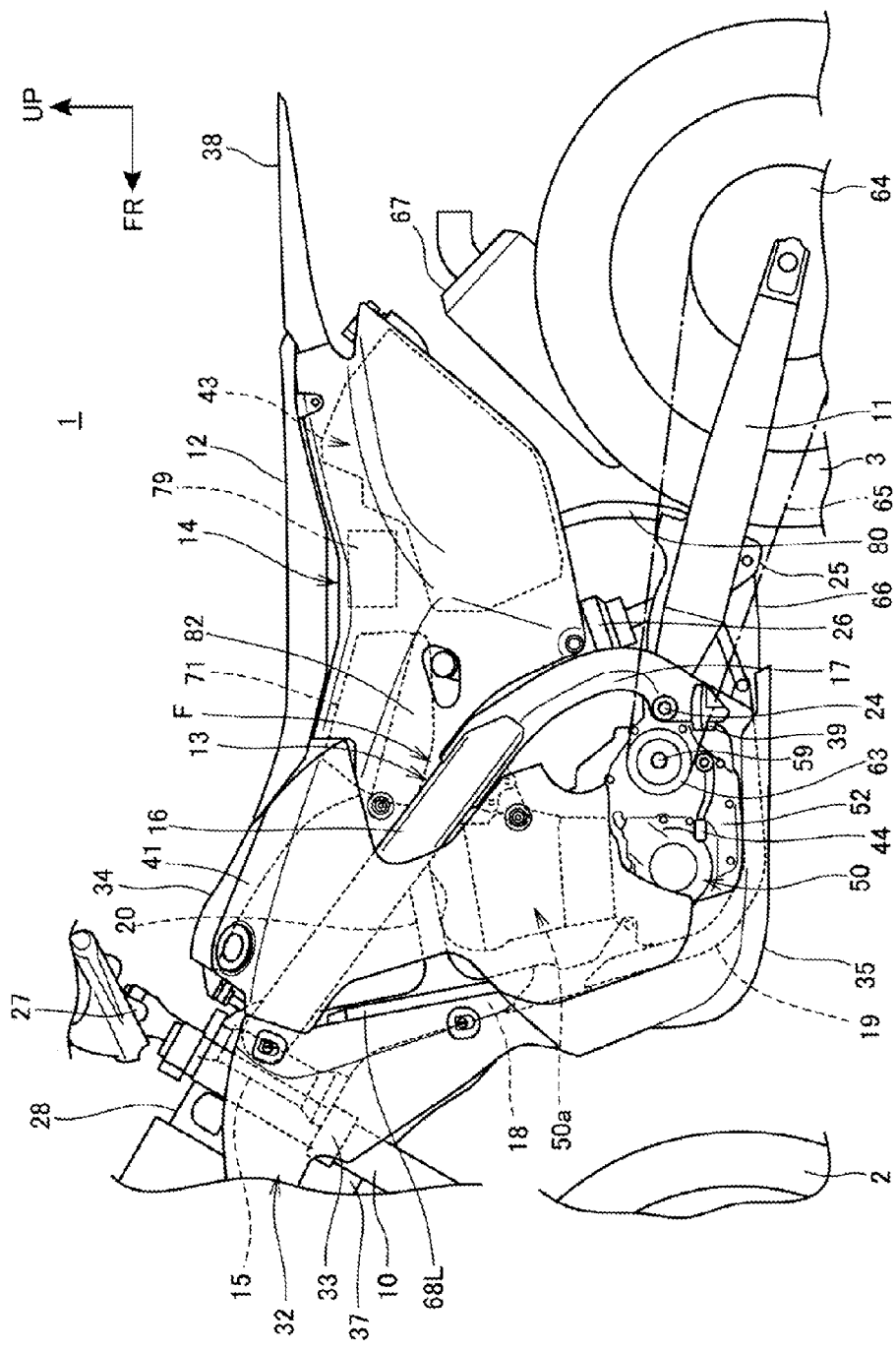
FIG. 2 is a left side view of the motorcycle.

FIG. 1 is a right side view of a motorcycle 1 according to an embodiment of the invention. FIG. 2 is a left side view of the motorcycle 1.

The motorcycle 1 is a vehicle where an engine 50 which constitutes a power unit is supported on a vehicle body frame F, a front fork 10 which supports a front wheel 2 is steerably supported on a front end of the vehicle body frame F, and a swing arm 11 which supports a rear wheel 3 is mounted on a rear portion of the vehicle body frame F.

The motorcycle 1 is a saddle-ride-type vehicle where a seat 12 on which a rider is seated in a straddling manner is arranged above a center portion of the vehicle body frame F in the longitudinal direction of the vehicle body frame F. Further, the motorcycle 1 is an off-road-type vehicle suitable for traveling on an uneven ground such as a sandy place. The motorcycle 1 has a large suspension stroke, and includes a large-sized fuel tank 40.

Figure 3:
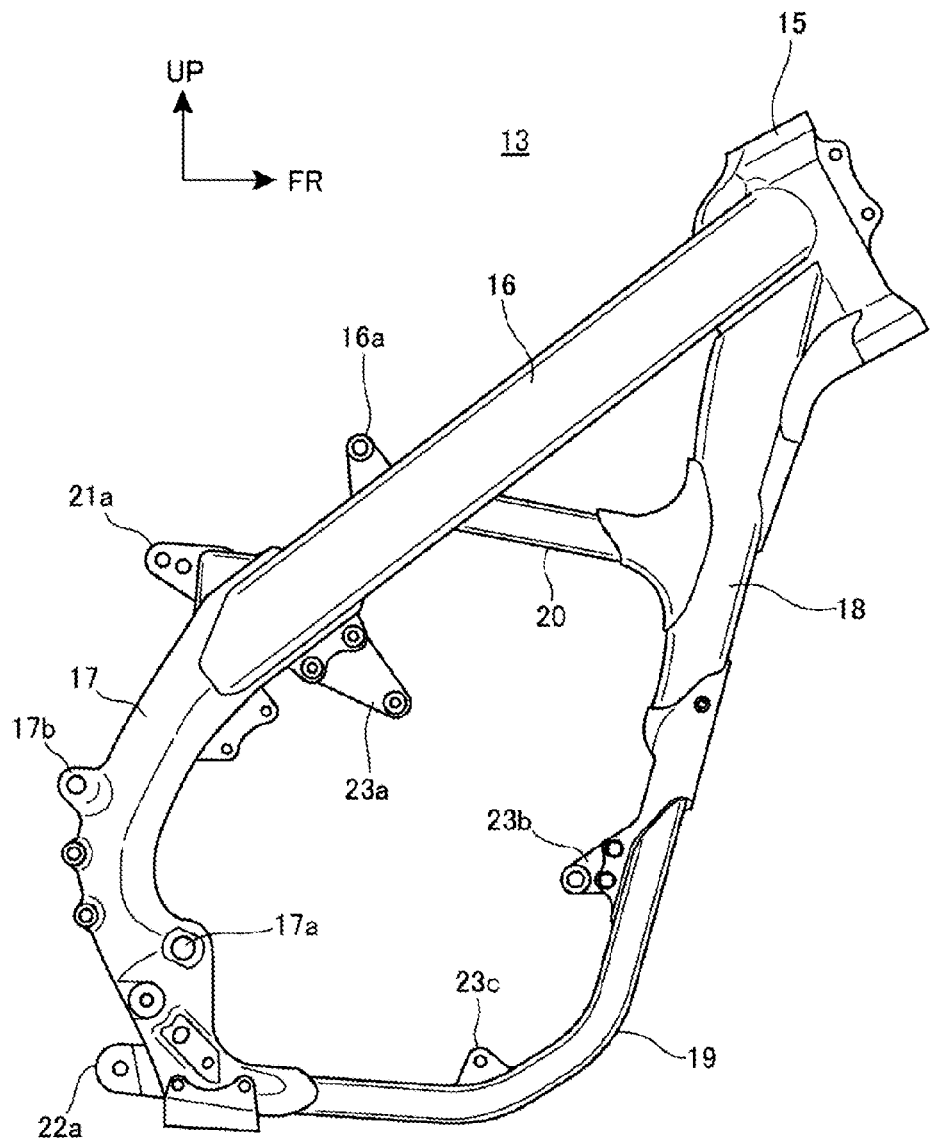
FIG. 3 is a right side view of a vehicle body frame.
Figure 4:
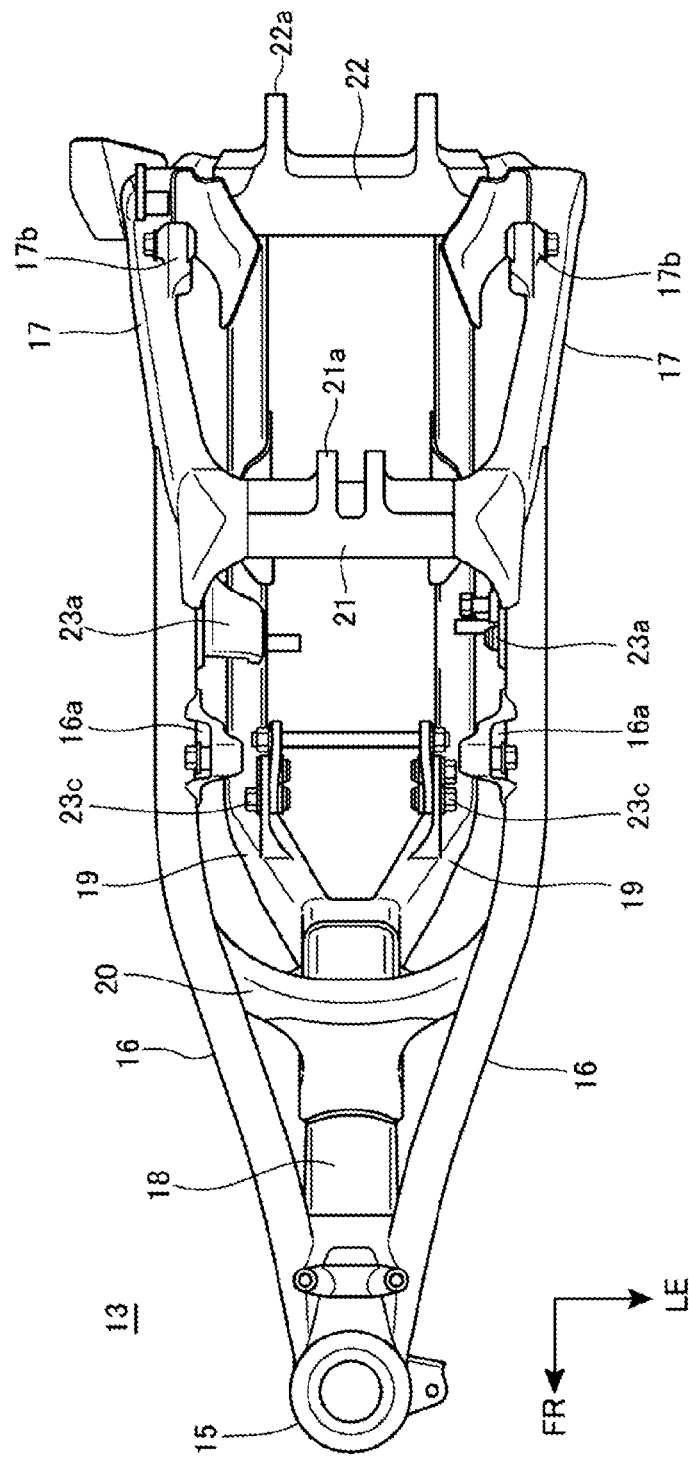
FIG. 4 is a plan view of the vehicle body frame.

FIG. 3 is a right side view of the vehicle body frame F. FIG. 4 is a plan view of the vehicle body frame F.

As shown in FIG. 1 to FIG. 4, the vehicle body frame F is constituted of: a front frame 13 which is formed into a basket shape by joining pipe members and plate members to each other by welding or the like; and a resin-made rear frame 14 which is connected to a rear portion of the front frame 13.

The front frame 13 includes: a head pipe 15 which is provided at a front end of the front frame 13; a pair of left and right main frames 16 which extend in an inclined manner in the oblique rearward and downward direction from the head pipe 15; and a pair of left and right pivot frames 17 which extend downward from rear ends of the respective main frames 16. The front frame 13 also includes a down frame 18 which extends rearward and downward from a rear face of a lower portion of the head pipe 15; and under frames 19 which extend downward after being branched to left and right sides from the down frame 18 and, thereafter, are bent rearward approximately horizontally, and are connected to lower ends of the pivot frames 17.

The front frame 13 includes a reinforcing frame 20 which connects an upper portion of the down frame 18 and middle portions of the main frames 16 in the longitudinal direction to each other. Further, the front frame 13 includes: an upper cross member 21 which connects upper portions of the left and right pivot frames 17 in the vehicle width direction; and a lower cross member 22 which connects lower portions of the pivot frames 17 in the vehicle width direction.

Engine stays 23a, 23b, 23c to which the engine 50 is fixed are mounted on rear portions of the main frames 16, upper portions of the under frames 19, and front ends of horizontal portions of the under frames 19.

A pivot hole portion 17a for supporting a pivot shaft 24 of the swing arm 11 is formed on lower portions of the pivot frames 17 respectively. The swing arm 11 has a front end thereof swingably and pivotally supported on the pivot shaft 24, and the rear wheel 3 is pivotally supported on a rear end of the swing arm 11.

A suspension connecting stay 21a which projects rearward is mounted on the upper cross member 21. A link connecting stay 22a which projects rearward is mounted on the lower cross member 22, and a link mechanism 25 which is connected to the swing arm 11 is connected to the link connecting stay 22a. A cylindrical rear suspension unit 26 has an upper end thereof connected to the suspension connecting stay 21a, has a lower end thereof connected to the link mechanism 25, and is arranged in a frontwardly inclined posture.

An upper frame stay 16a which projects upward is mounted on upper faces of the rear portions of the main frames 16 respectively.

A lower frame stay 17b which projects rearward is mounted on rear faces of middle portions of the pivot frames 17 in the vertical direction respectively.

The front fork 10 is rotatably and pivotally supported on the head pipe 15 by way of a steering shaft (not shown in the drawing), and the front wheel 2 is pivotally supported on a lower end of the front fork 10. A steering handle 27 is fixed to an upper end of the front fork 10.

A front stay 28 which projects frontward is fixed to a front portion of the head pipe 15, and a headlight 29, a plate-shaped wind screen 30 and meters 31 are supported on the front stay 28.

The fuel tank 40 includes: a pair of left and right front tanks 41 and 42 which is arranged on left and right sides of the respective main frames 16 in a divided manner; and a rear tank 43 which is arranged in the rear frame 14.

The seat 12 extends rearward contiguously with rear portions of the front tanks 41 and 42, and is supported on an upper portion of the rear frame 14.

The motorcycle 1 includes a resin-made vehicle body cover 32. The vehicle body cover 32 includes: a pair of left and right shrouds 33 which cover an upper portion of the front fork 10 and the down frame 18 from lateral sides of the motorcycle 1; a tank cover 34 which covers the front tanks 41 and 42 from above; an under cover 35 which covers the under frame 19 and a crankcase 52 of the engine 50 from a front side and from below; and a pair of left and right fork covers 36L, 36R (only the right fork cover 36R shown in the drawing) which covers a lower portion of the front fork 10.

A front fender 37 which covers the front wheel 2 from above is fixed to the front fork 10. A rear fender 38 which covers the rear wheel 3 from above is fixed to the rear frame 14 behind the seat 12.

A pair of left and right steps 39 on which the rider places his feet is mounted on lower ends of the pivot frames 17 respectively. A shift pedal 44 is arranged in front of the left step, and a brake pedal 45 is arranged in front of the right step.

Figure 5:
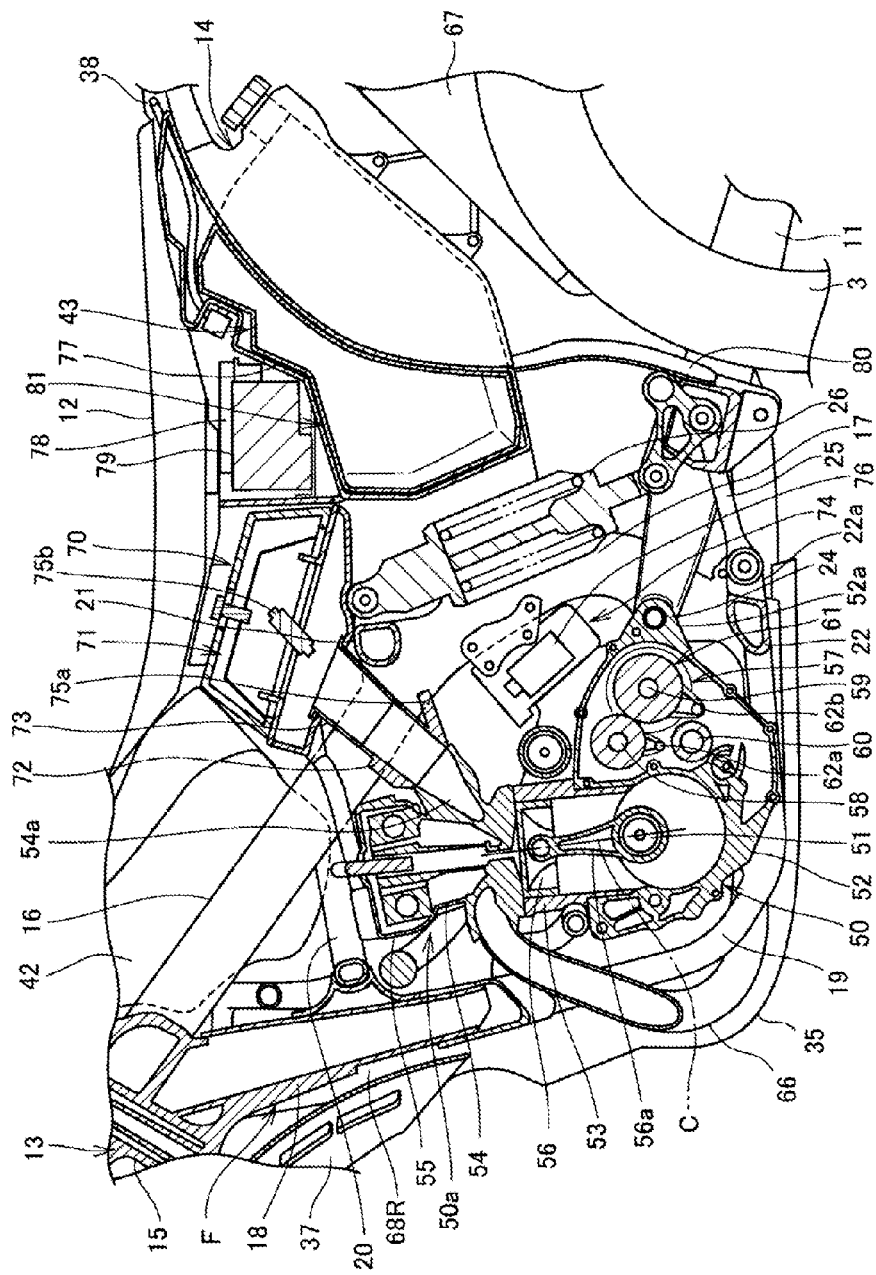
FIG. 5 is a cross-sectional view of the constitution around an engine.

FIG. 5 is a cross-sectional view of the constitution of the engine 50 and the surrounding of the engine 50.

As shown in FIG. 1, FIG. 2 and FIG. 5, the engine 50 is a water-cooled single-cylinder 4-cycle engine, and is supported in the inside of the basket-shaped front frame 13. A crankshaft 51 of the engine 50 is arranged in a horizontally extending manner in the vehicle width direction. The engine 50 includes the crankcase 52, and a cylinder portion 50a which projects upward from an upper face of a front portion of the crankcase 52. The cylinder portion 50a includes: a cylinder 53; a cylinder head 54 which is connected to an upper face of the cylinder 53; and a head cover 55 which covers a valve operating chamber of the cylinder head 54. The engine 50 has a cylinder axis C thereof slightly inclined frontward with respect to the vertical direction. A piston 56 which is connected to the crankshaft 51 by way of a connecting rod 56a is arranged in the inside of the cylinder 53.

An upper portion of the head cover 55 overlaps with a lower edge of the reinforcing frame 20 as viewed in a side view.

While being supported on the above-mentioned engine stays 23a, 23b, 23c, the engine 50 is also supported on the front frame 13 by inserting the pivot shaft 24 into a fixed portion 52a formed on a rear portion of the crankcase 52.

A transmission 57 is incorporated in a rear portion of the engine 50. The transmission 57 includes: an input shaft 58 which is driven by the crankshaft 51; an output shaft 59 which is arranged parallel to the input shaft 58; and a shift drum 60 which is rotated due to a gear shifting operation by the shift pedal 44. A constant mesh gear train 61 is mounted on the input shaft 58 and the output shaft 59. The gear shifting is performed by changing over the gear train 61 by shift forks 62*a*, 62*b* which are interlocked with the shift drum 60.

The output shaft 59 projects leftward from a rear portion of the crankcase 52, and a drive sprocket 63 (FIG. 2) is fixed to a shaft end of the output shaft 59. An output of the engine 50 is transmitted to the rear wheel 3 by way of a drive chain 65 which is extended between and wounded around the drive sprocket 63 and a driven sprocket 64 of the rear wheel 3. The drive sprocket 63 is covered with a sprocket cover (not shown in the drawing).

An exhaust pipe 66 of the engine 50 extends frontward and downward from a front face of the cylinder head 54, is pulled out to a right side, extends rearward along the under frame 19, and is connected to a muffler 67 which is arranged on a right side of the rear wheel 3. The muffler 67 is supported on the rear frame 14.

A pair of plate-shaped radiators 68L and 68R, in which cooling water for cooling the engine 50 circulates, is arranged between the down frame 18 and a pair of left and right shrouds 33 respectively.

The front tanks 41 and 42 extend between the shrouds 33 and the rear frame 14 respectively, and extend downward from the lateral outside of the main frames 16, and have a size which allows the front tanks 41 and 42 to cover an area including the cylinder portion 50*a* and lateral sides of the front portion of the crankcase 52.

An intake device 70 of the engine 50 is arranged below the seat 12 and behind the cylinder head 54. The intake device 70 includes: an air cleaner 71 which takes outside air therein after cleaning the outside air; a throttle body 72 which is connected to an intake port 54*a* of the cylinder head 54; and a connecting tube 73 which connects the throttle body 72 and the air cleaner 71 to each other.

The air cleaner 71 is arranged behind the front tanks 41 and 42 contiguously, and is positioned above the rear suspension unit 26. In this embodiment, the air cleaner 71, the connecting tube 73, and the throttle body 72 are arranged linearly in the frontward and downward direction toward an engine 50 side and hence, an intake resistance is decreased, whereby the engine 50 can acquire high intake efficiency.

A fuel supply device 74 for the engine 50 is arranged below the intake device 70. The fuel supply device 74 includes: injectors 75*a* and 75*b* which inject fuel into an intake passage formed in the throttle body 72, and a fuel pump 76 which supplies fuel to the injectors 75*a* and 75*b*.

Fuel in the front tanks 41 and 42 and fuel in the rear tank 43 are merged, the merged fuel is sucked by a fuel pump 76 and is discharged to the injectors 75*a* and 75*b* from the fuel pump 76.

The fuel pump 76 is formed in a cylindrical shape, and is arranged in a frontwardly inclined posture above the rear portion of the crankcase 52 and in front of the rear suspension unit 26.

An electric equipment storage portion 77 is mounted on the rear frame 14 behind the air cleaner 71, and an ECU 78 which constitutes a control part of the motorcycle 1 and a battery 79 are stored in the electric equipment storage portion 77.

A mud guard 80 which extends downward toward a position in front of the rear wheel 3 is mounted on a lower portion of the rear frame 14.

Figure 6:
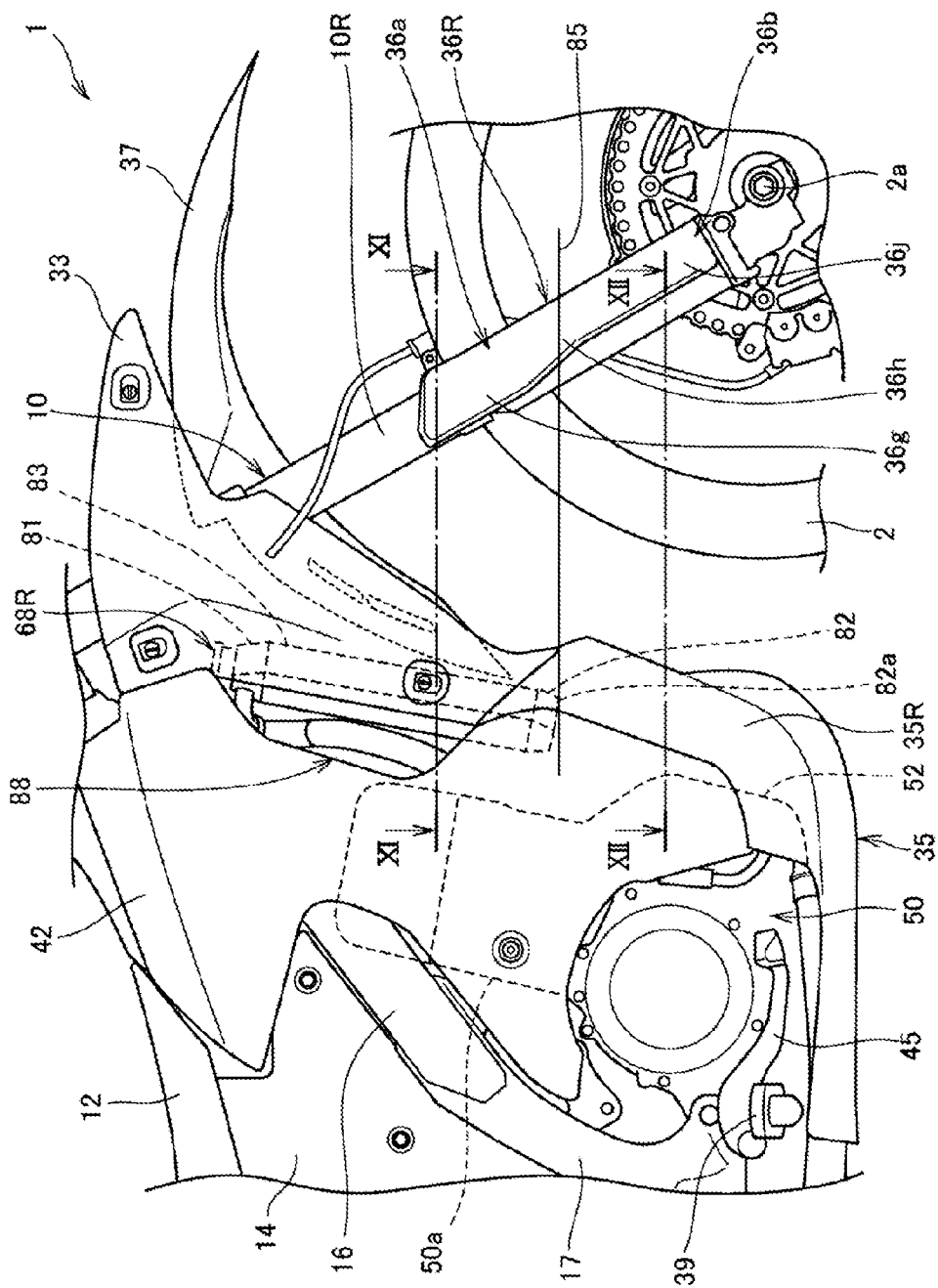
FIG. 6 is a right side view showing a part of a front portion of the motorcycle.

FIG. 6 is a right side view showing an essential part of the front portion of the motorcycle 1.

The front fork 10 is arranged in front of the radiators 68L and 68R (only the radiator 68R on a viewer's side shown in the drawing), and the front fork 10 extends vertically in a straddling manner in the height direction of the radiators 68L and 68R. The radiators 68L and 68R are arranged in front of the cylinder portion 50*a* of the engine 50 and above a front end of the crankcase 52. Most of lateral sides of the radiators 68L and 68R are covered with the shrouds 33, and the radiators 68L and 68R are slightly exposed to the outside from gaps 88 formed between the shrouds 33 and the front tanks 41, 42 (only the front tank 42 on a viewer's side shown in the drawing).

To be more specific, each radiator 68L and 68R is constituted of an upper tank 81, a lower tank 82, and a core 83 which is arranged between the upper tank 81 and the lower tank 82. The upper tank 81 and the lower tank 82 are connected to the engine 50 by way of a radiator hose respectively. The core 83 includes: a plurality of pipes which connect the upper tank 81 and the lower tank 82 to each other for allowing cooling water to flow therethrough; and heat radiation fins arranged between the respective pipes.

The fork covers 36L and 36R (only the fork cover 36R on a viewer's side shown in the drawing), which cover a lower portion of the front fork 10 from a front side, are parts which protect the lower portion of the front fork 10 from scattering pebbles or the like. Lower end portions of the fork covers 36L and 36R are positioned in the vicinity of an axle 2*a* of the front wheel 2 arranged below the lower ends of the radiators 68L and 68R, and upper end portions of the fork covers 36L and 36R are positioned above the lower ends (lower end 82*a* of the lower tank 82) of the radiators 68L and 68R. In the drawing, the motorcycle 1 is in a 1G state where a rider rides on the motorcycle 1. Accordingly, compared to a state where the rider does not ride on the motorcycle, the vehicle body slightly sinks so that the front fork 10 is compressed. A horizontal line 85 which passes through lower ends 82*a* of the radiators 68L and 68R, approximately passes through the centers of the fork covers 36L and 36R in the height direction.

Figure 7:
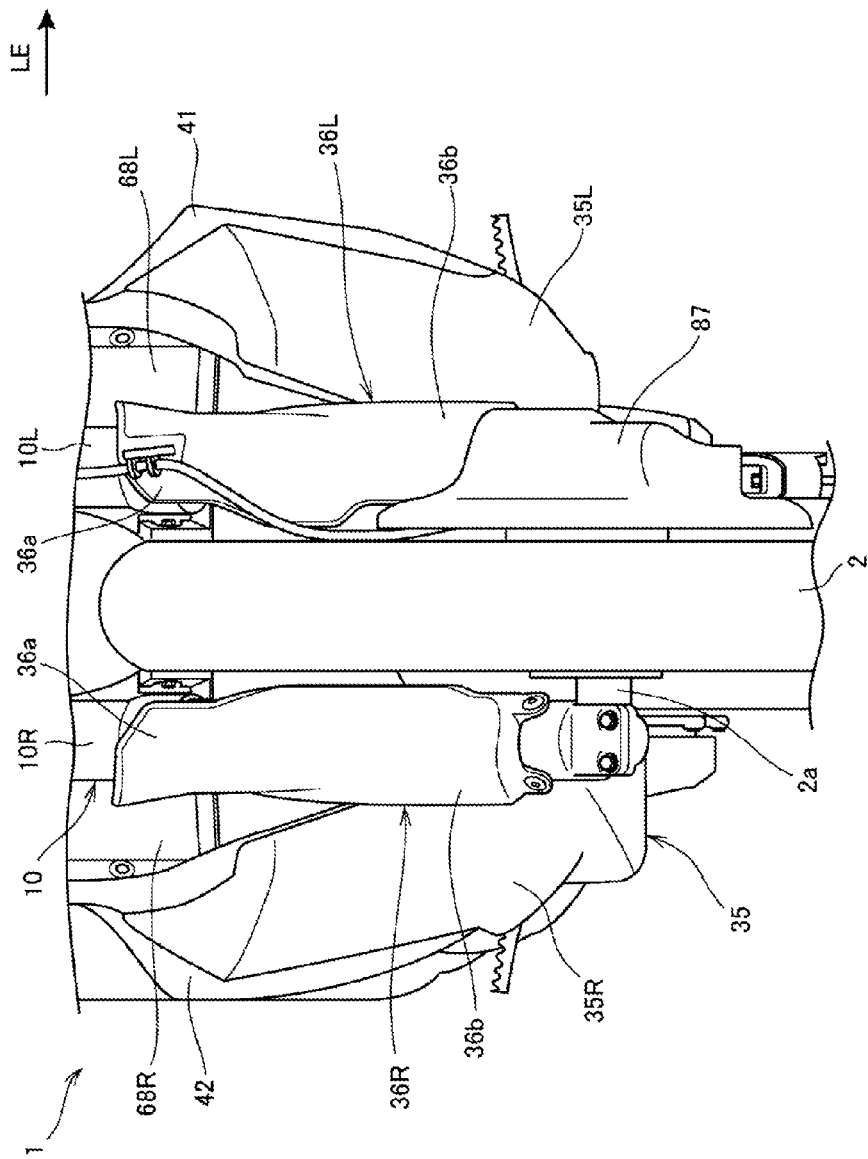
FIG. 7 is a front view showing the part of the front portion of the motorcycle.

FIG. 7 is a front view showing the essential part of the front portion of the motorcycle 1.

A pair of left and right fork assemblies 10L and 10R which constitutes the front fork 10 is a telescopic assembly provided with a spring and a damper. A lower tube is slidably mounted relative to an upper tube, and the front wheel 2 is supported on a lower end of the lower tube by means of an axle 2*a*. The resin-made fork covers 36L and 36R are mounted on lower end portions (the above-mentioned lower tubes) of the fork assemblies 10L and 10R respectively. The fork covers 36L and 36R are arranged along the fork assemblies 10L and 10R on both lateral sides of the front wheel 2. Respective upper portions 36*a* of the fork covers 36L and 36R are positioned in front of the pair of left and right radiators 68L and 68R in the longitudinal direction of the vehicle body. Left and right front side portions 35L and 35R of the undercover 35 cover left and right front sides of the crankcase 52 (see FIG. 1), and project more outward in the vehicle width direction than fork covers 36L and 36R. The left and right front tanks 41, 42 project more outward in the vehicle width direction than the front side portions 35L and 35R.

The fork covers 36L and 36R have a function of controlling the flow of traveling wind during traveling of the motorcycle 1 in addition to a function of protecting the fork assemblies 10L and 10R. That is, traveling wind is guided to the left and right radiators 68L and 68R by the respective upper portions 36*a* of the fork covers 36L and 36R, and the traveling wind is made to flow further sideward than the left and right front tanks 41 and 42 by the respective lower portions 36*b* of the fork covers 36L and 36R. The front side portions 35L and 35R cover lower portions of the front tanks 41 and 42 from a front side. Symbol 87 indicates a disc brake cover which covers a front-wheel disc brake from a lateral side.

Figure 8A:
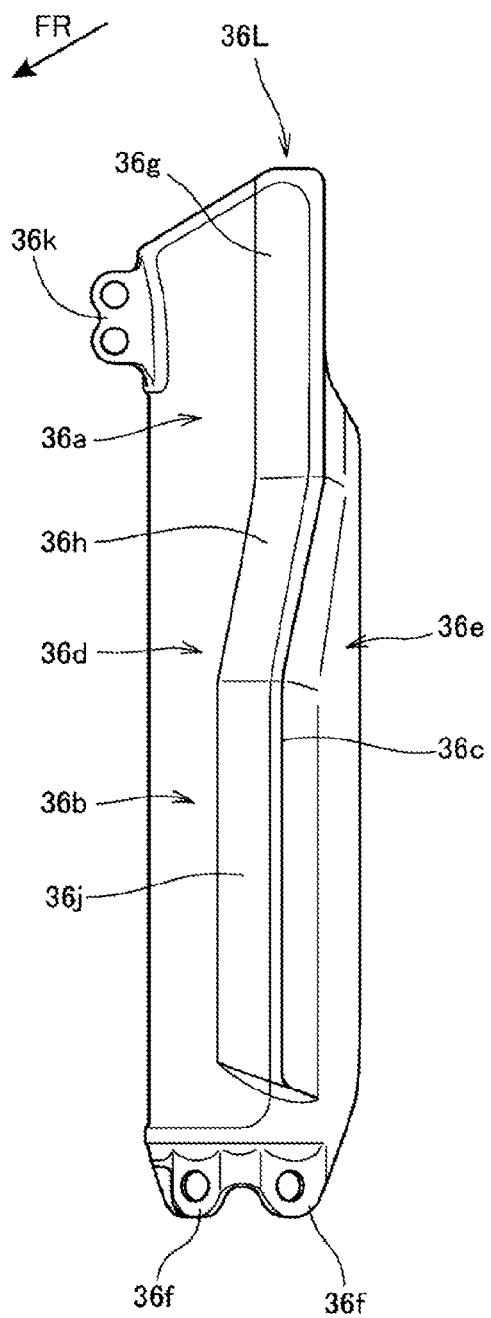
FIGS. 8A and 8B are explanatory views showing a left fork cover.
Figure 8B:
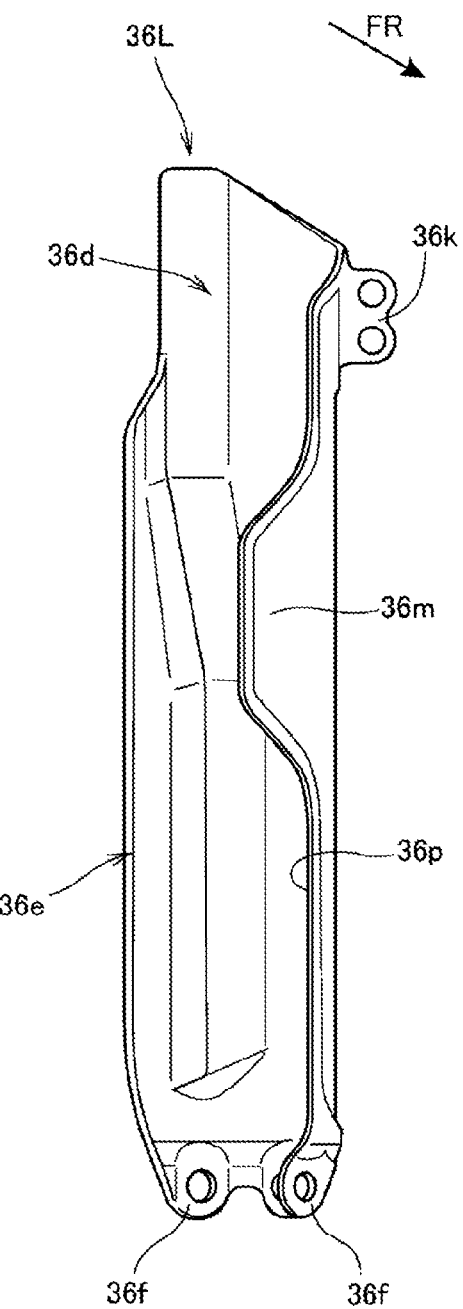
Figures 9A, 9B:
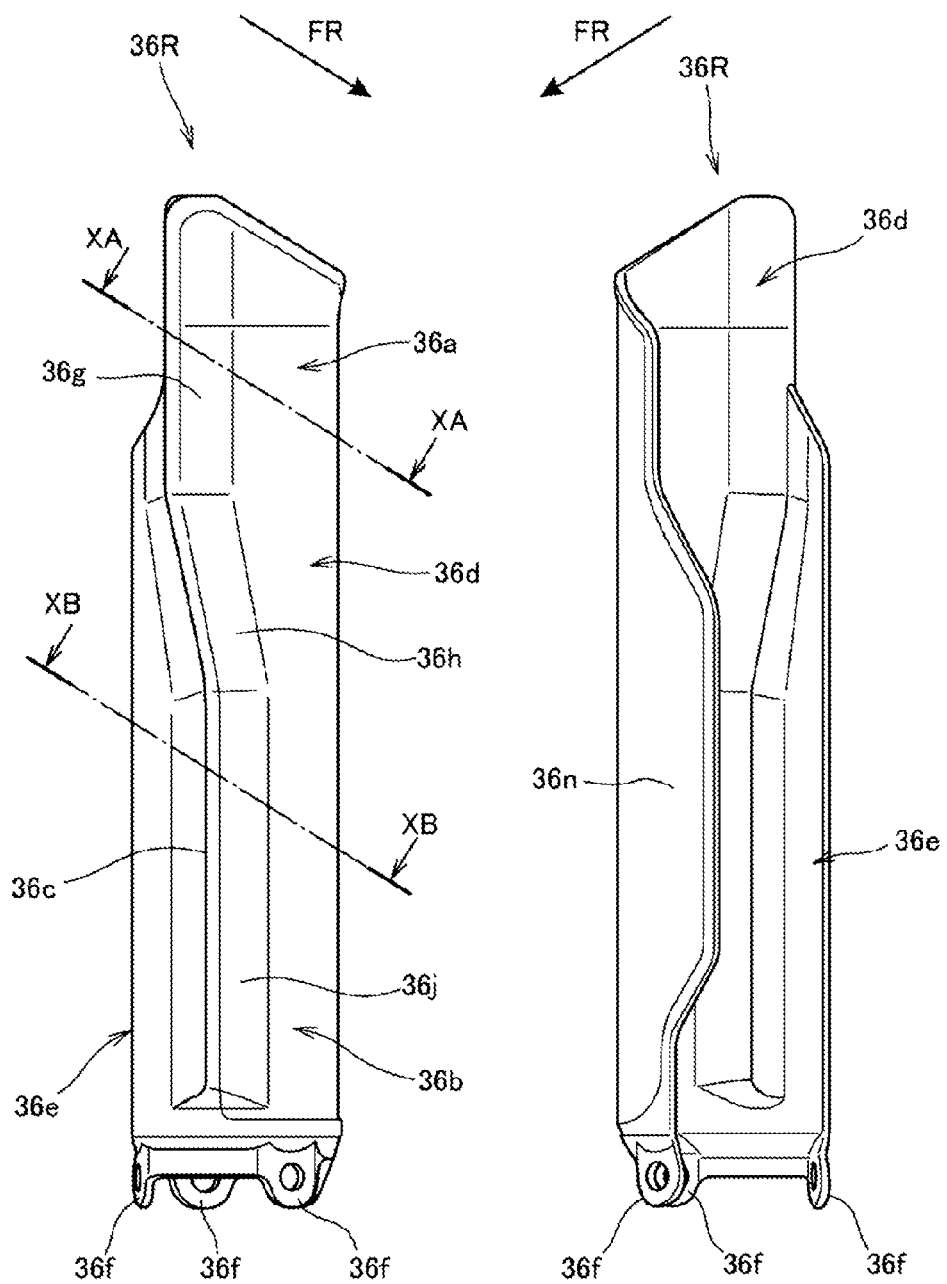
FIGS. 9A and 9B are explanatory views showing a right fork cover.

FIG. 8 is an explanatory view showing the fork cover 36L on a left side. FIG. 8A is a view where the fork cover 36L is viewed from the outside in the vehicle width direction, and FIG. 8B is a view where the fork cover 36L is viewed from the inside in the vehicle width direction. FIG. 9 is an explanatory view showing the fork cover 36R on a right side. FIG. 9A is a view where the fork cover 36R is viewed from the outside in the vehicle width direction, and FIG. 9B is a view where the fork cover 36R is viewed from the inside in the vehicle width direction.

As shown in FIG. 8A and FIG. 9A, each fork cover 36L and 36R is configured such that a ridge 36c extending in the longitudinal direction of the fork cover 36L and 36R is formed in an outwardly projecting manner in the vehicle width direction, and a front wall 36d arranged in front of the ridge 36c and a rear wall 36e arranged behind the ridge 36c are integrally formed with each other. A plurality of mounting portions 36f for mounting the respective fork covers 36L and 36R to lower portion of the fork assemblies 10L and 10R are integrally formed on lower ends of the respective fork covers 36L and 36R by using small bolts.

The front wall 36d has an upper side surface 36g, an intermediate side surface 36h and a lower side surface 36j in this order from the top. These side surfaces form the ridge 36c. The lower side surface 36j is arranged in an offset manner toward a front side of the vehicle body with respect to the upper side surface 36g. The intermediate side surface 36h is inclined in the longitudinal direction so as to connect the upper side surface 36g and the lower side surface 36j. With respect to the fork covers 36L and 36R, an upper end portion side including the upper side surface 36g is referred to as an upper portion 36a, and a lower end portion side including the lower side surface 36j is referred to as a lower portion 36b.

A projecting wall 36k integrally projecting frontward is formed on an upper portion of the front wall 36d of the fork cover 36L on a left side, and a brake hose which is connected to a front wheel disc brake is fixed to the projecting wall 36k. The rear wall 36e of each fork cover 36L and 36R has an upper end thereof positioned below an upper end of the front wall 36d.

As shown in FIG. 8B and FIG. 9B, rearward projecting walls 36m and 36n which project toward a rear side of the vehicle body are respectively integrally formed with inner sides of front walls 36d of the respective fork covers 36L and 36R in the vehicle width direction. The rearward projecting walls 36m and 36n are portions which block scattering pebbles or the like scattered from a front wheel 2 side.

An escape portion 36p for avoiding the interference with the front wheel disc brake is formed on a lower portion of the rearward projecting wall 36m of the fork cover 36L on a left side and hence, the rearward projecting wall 36m has a smaller vertical width compared to the rearward projecting wall 36n of the fork cover 36R on a right side.

Figure 10A:
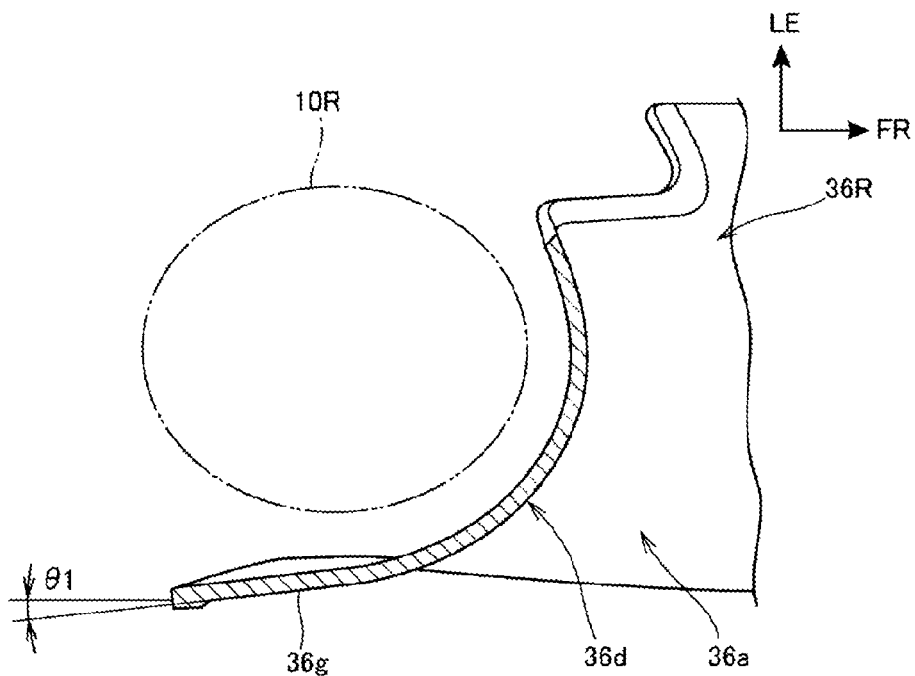
FIGS. 10A and 10B are cross-sectional views of the right fork cover.
Figure 10B:
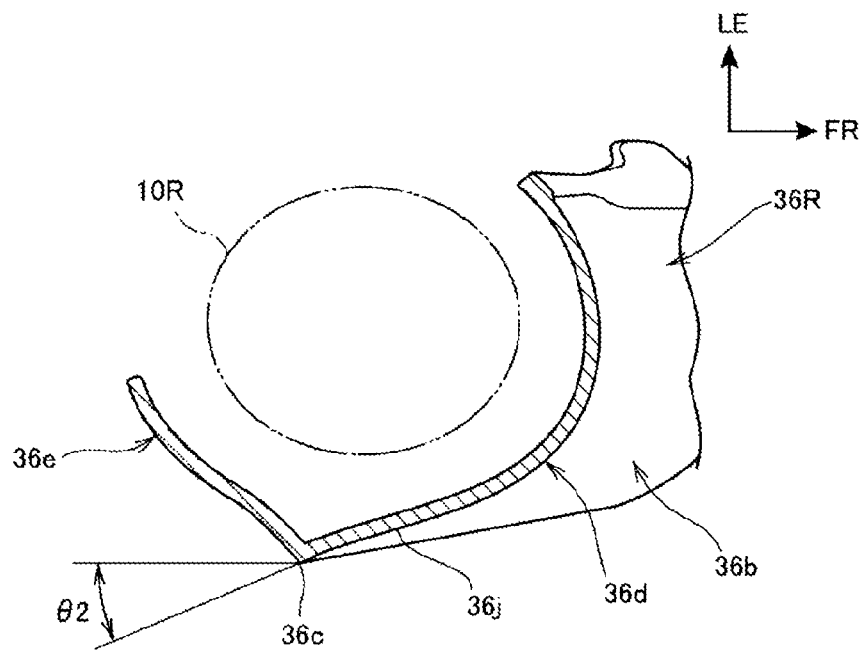

FIG. 10 is a cross-sectional view of the fork cover 36R on a right side. FIG. 10A is a cross-sectional view taken along a line XA-XA in FIG. 9A, and FIG. 10B is a cross-sectional view taken along a line XB-XB in FIG. 9A.

As shown in FIG. 10A, the upper side surface 36g of the upper portion 36a in the fork cover 36R on a right side is continuously formed with an arcuate cross-sectional portion of a front portion of the front wall 36d, and the upper side surface 36g extends approximately linearly and obliquely rearward and sideward in cross section. θ1 in the drawing indicates an inclination angle of the upper side surface 36g with respect to the longitudinal direction of the vehicle body.

As shown in FIG. 10B, the lower side surface 36j of the lower portion 36b in the fork cover 36R is continuously formed with an arcuate cross-sectional portion of the front portion of the front wall 36d, and the lower side surface 36j extends approximately linearly and obliquely rearward and sideward in cross section. θ2 in the drawing indicates an inclination angle of the lower side surface 36j with respect to the longitudinal direction of the vehicle body, and is larger than the inclination angle θ1 of the upper side surface 36g shown in FIG. 10A.

The fork cover 36L on a left side (see FIG. 8A and FIG. 8B) has a cross-sectional shape which is in left-and-right symmetry with the above-mentioned cross-sectional shape of the fork cover 36R on a right side.

A traveling wind straightening action of the above-mentioned fork covers 36L, 36R is explained hereinafter.

Figure 11:
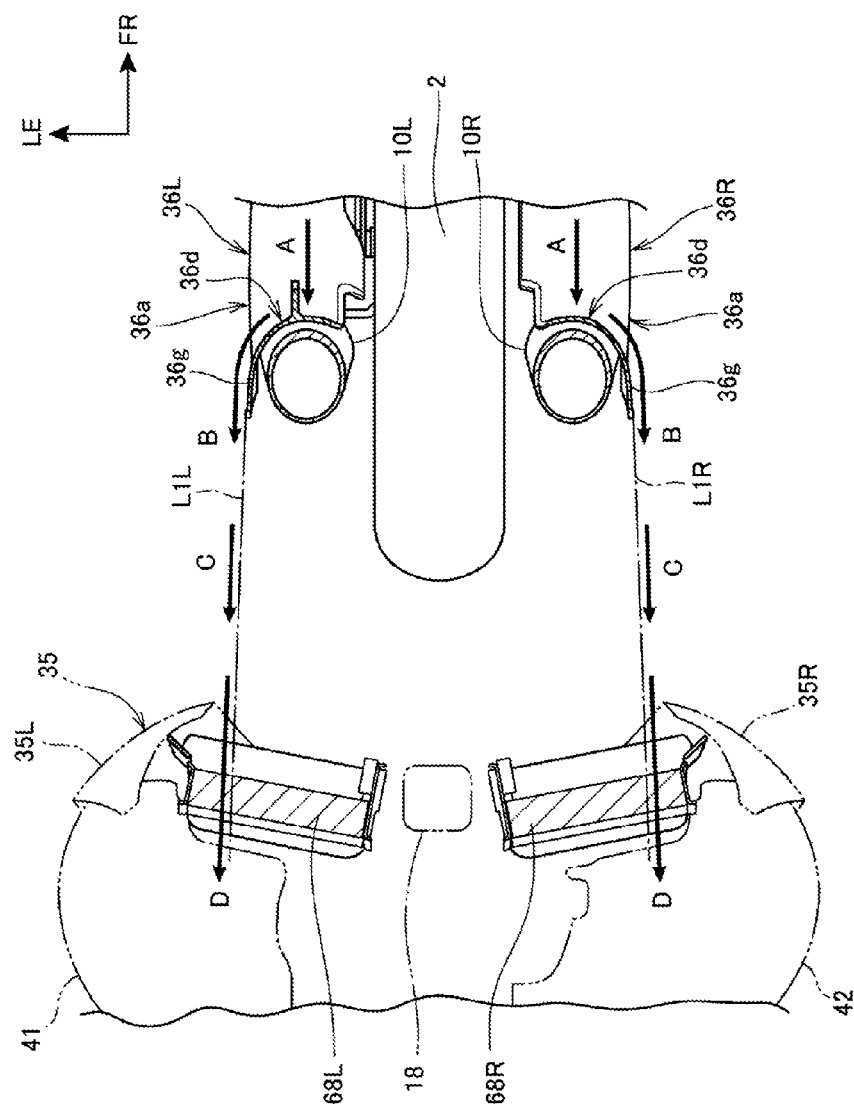
FIG. 11 is an operational view showing the straightening action generated by an upper portion of the fork cover.

FIG. 11 is an operational view showing a straightening action of the upper portions 36a of the fork covers 36L and 36R, and shows a cross section taken along a line XI-XI in FIG. 6. Symbols L1L and L1R in the drawing indicate extension lines of the upper side surfaces 36g of the left and right fork covers 36L and 36R, and the extension lines L1L and L1R pass through front surfaces of the left and right radiators 68L and 68R.

When traveling wind impinges on the upper portions 36a of the fork covers 36L and 36R from a front side of the vehicle as indicated by arrows A during traveling of the motorcycle, the traveling wind is routed around to an upper side surface 36g side along the front wall 36d as indicated by arrows B and C and, thereafter, the traveling wind flows along the upper side surfaces 36g, and approximately flows along the extension lines toward a rear side of the vehicle body. Then, the traveling wind, as indicated by arrows D, passes along the inner side of the front side portions 35L and 35R of the undercover 35, and passes the inside of the left and right radiators 68L and 68R.

In this manner, traveling wind can be straightened toward the radiators 68R and 68L by using the upper portions 36a of the fork covers 36L and 36R and hence, cooling property of the radiators 68R and 68L can be enhanced. Further, the fork covers 36L and 36R perform both a function of protecting the front fork 10 and a function of straightening member traveling wind, and hence, the number of parts can be decreased whereby a manufacturing cost can be suppressed.

Figure 12:
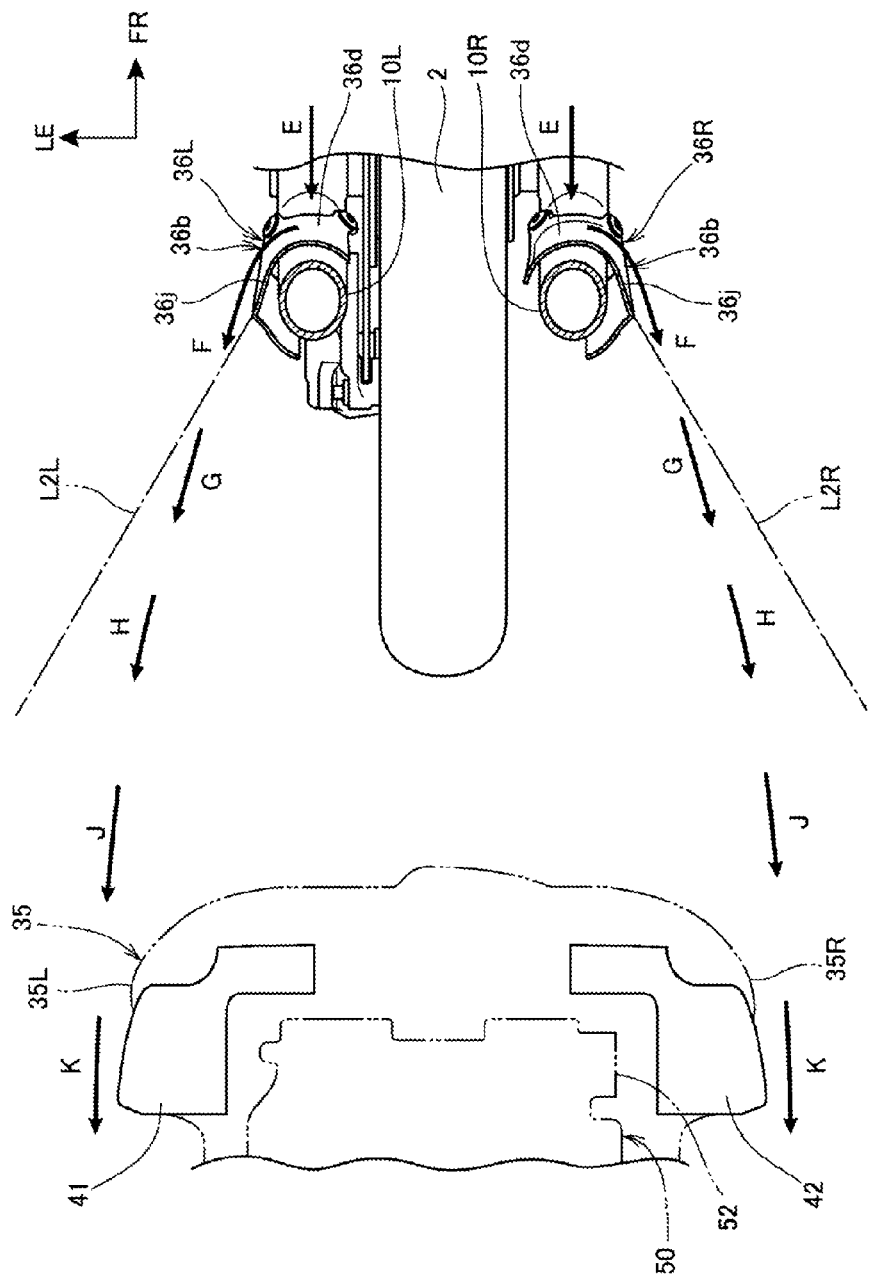
FIG. 12 is an operational view showing the straightening action generated by a lower portion of the fork cover.

FIG. 12 is an operational view showing a straightening action of the lower portions 36b of the fork covers 36L and 36R, and shows a cross section taken along a line XII-XII in FIG. 6. Symbols L2L and L2R in the drawing indicate extension lines of the lower side surfaces 36j of the left and right fork covers 36L and 36R, and the extension lines L2L and L2R do not overlap with the vehicle.

When traveling wind impinges on the lower portions 36b of the fork covers 36L and 36R from a front side of the vehicle as indicated by arrows E during traveling of the motorcycle, the traveling wind is routed around to a lower side surface 36j side along the front wall 36d as indicated by arrows F, G, H, and J and, thereafter, the traveling wind flows along the lower side surfaces 36j, and flows approximately along the extension lines toward a rear side of the vehicle body. Then, the traveling wind, as indicated by arrows K, flows toward a rear side of the vehicle body while passing along lateral sides of the front side portions 35L and 35R of the undercover 35 and lateral sides of the front tanks 41 and 42.

In this manner, traveling wind is made to flow along the lateral sides of the front side portions 35L and 35R of the undercover 35 and the lateral sides of the front tanks 41 and 42 by using the lower portions 36b of the fork covers 36L and 36R and hence, the traveling wind hardly impinges on the vehicle body, whereby the traveling wind can be straightened and traveling resistances can be decreased. Further, the fork covers 36L and 36R separately perform straightening of the traveling wind such that the traveling wind is straightened toward radiators 68L and 68R (see FIG. 11) sides by the upper portions 36a, and the traveling wind is straightened toward lateral sides of the vehicle body by using the lower portions 36b of the fork covers 36L and 36R. Accordingly, it is unnecessary to particularly provide members for straightening a traveling wind toward the respective directions and hence, a manufacturing cost can be decreased also from this point of view. Further, an amount of traveling wind which flows along the lateral sides of the front tanks 41 and 42 is increased and hence, the front tanks 41 and 42 are further cooled. As a result, the evaporation of fuel in the front tanks 41 and 42 can be suppressed.

As shown in the above-mentioned FIG. 1, FIG. 5 and FIG. 6, the motorcycle 1 includes: the main frame 16 which extends rearward and downward from the head pipe 15; the engine 50 which has the cylinder axis extending in the vertical direction and is arranged below the main frame 16; the radiators 68L and 68R which are arranged in front of the engine 50; the front fork 10 which is rotatably supported on the head pipe 15; and the fork covers 36L and 36R which cover a lower portion of the front fork 10. The radiators 68L and 68R are arranged above the crankcase 52 of the engine 50 as viewed in a side view. The front fork 10 is arranged over the radiators 68L and 68R in a straddling manner in the vertical direction as viewed in a side view. The upper surfaces 36g, of the fork covers 36L and 36R arranged above the lower ends of the radiators 68L and 68R in the vertical direction extend toward the radiators 68L and 68R, and lower surfaces 36j of the fork covers 36L and 36R arranged below the lower ends of the radiators 68L and 68R extend toward a side of the crankcase 52 extending to the outside more than the radiators 68L and 68R.

Due to such a constitution, traveling wind is guided to the radiators 68L and 68R by using the upper surfaces 36g of the fork covers 36L and 36R and hence, a cooling effect of the radiators 68L and 68R can be enhanced. At the same time, by making traveling wind flow toward the lateral sides of the crankcase by using the lower surfaces 36j of the fork covers 36L and 36R, traveling resistance can be decreased. In this manner, while enabling both the enhancement of cooling property of the radiators and the reduction of traveling resistance, it is possible to prevent the increase in the number of parts or the like.

Further, as shown in FIG. 6, FIG. 7 and FIG. 11, the radiators are formed of the pair of left and right radiators 68L and 68R, the motorcycle 1 includes the down frame 18 which extends rearward and downward from the head pipe 15 below the main frame 16, and the radiators 68L and 68R are arranged on left and right sides of the down frame 18 respectively. Accordingly, traveling wind can be guided to the radiators 68L and 68R arranged on left and right sides by using the left and right fork covers 36L, 36R thus allowing the radiators 68L and 68R to efficiently cool the engine.

Further, as shown in FIG. 6 and FIG. 12, the motorcycle 1 includes the under cover 35 which constitute the front lower cover for covering left and right front sides of the crankcase 52 respectively, and the lower surfaces 36j of the fork covers 36L and 36R extend toward the outside from the under cover 35. Accordingly, it is possible to make it difficult for a traveling wind to impinge on the vehicle body by using the fork covers 36L and 36R whereby traveling resistance can be further decreased.

Further, the front tanks 41 and 42 which constitute the fuel tanks are positioned on one side of the crankcase 52 and hence, a traveling wind is made to flow along the lateral sides of the front tanks 41 and 42 by using the fork covers 36L and 36R thus cooling the front tanks 41 and 42. Accordingly, evaporation of fuel can be suppressed.

The above-mentioned embodiment merely shows one mode of carrying out the invention, and various modifications and variations are desirably conceivable without departing from the gist of the invention.

For example, in the above-mentioned embodiment, the positional relationship of the fork covers 36L and 36R is described with reference to the lower ends of the radiators 68L and 68R in FIG. 6. However, the vertical position of the fork covers 36L and 36R changes with respect to the lower ends of the radiators 68L and 68R depending on a vertical movement of the vehicle body or a loading amount and hence, the invention also includes, in the scope thereof, fork covers which change the flow of a traveling wind toward the inside of the vehicle and the outside of the vehicle in the vicinity of the lower ends of the radiators 68L and 68R in a usual use time of the motorcycle 1.

The invention is applicable not only to a motorcycle but also to saddle-ride-type vehicles including vehicles other than a motorcycle. The saddle-ride-type vehicle is a vehicle which includes vehicles in general where a rider is seated on a vehicle body in a straddling manner, and covers not only a motorcycle (including a bicycle with a prime mover part) but also a three-wheeled vehicle and a four-wheeled vehicle classified into ATV (all terrain vehicles).

We claim:

1. A saddle-type vehicle, comprising:
a head pipe;
a steering shaft rotatably supported on said head pipe;
a main frame extending rearward and downward from said head pipe;
an engine including a crankcase, said engine having a cylinder with a cylinder axis extending in a vertical direction, said engine being disposed below said main frame;
at least one radiator disposed in front of said engine;
a front fork supported on said steering shaft; and
a front fork cover which covers a lower portion of said front fork,
wherein said at least one radiator is disposed higher than said crankcase of said engine, as viewed in a side view of the vehicle,
wherein said front fork is disposed over said at least one radiator, in the vertical direction, as viewed in the side view of the vehicle,
wherein an upper side surface of said front fork cover, which is disposed higher than a lower end of said at least one radiator in the vertical direction, extends in a direction toward said at least one radiator, the upper side surface extending approximately linearly and obliquely rearward and sideward in cross-section, and
wherein a lower side surface of said front fork cover, which is disposed lower than said lower end of said at least one radiator in the vertical direction, extends in a direction toward a side of said crankcase which is further to an outside of said vehicle than said at least one radiator, in a vehicle width direction, the lower side surface extending approximately linearly and obliquely rearward and sideward in cross-section.

2. The saddle-type vehicle according to claim 1, wherein said at least one radiator comprises a pair of left and right radiators, wherein said vehicle further comprises a down frame which extends rearward and downward from said head pipe, below said main frame, and wherein said pair of left and right radiators are respectively disposed at left and right sides of said down frame.

3. The saddle-type vehicle according to claim 2, wherein said vehicle further comprises a front lower cover which covers left and right front sides of said crankcase respectively, and wherein said lower side surface of said front fork cover extends in a direction further to the outside of said vehicle than said front lower cover, in the vehicle width direction.

4. The saddle-type vehicle according to claim 3, wherein a fuel tank is disposed at a side of said crankcase, in the vehicle width direction.

5. The saddle-type vehicle according to claim 1, wherein said vehicle further comprises a front lower cover which covers left and right front sides of said crankcase respectively, and wherein said lower side surface of said front fork cover extends in a direction further to the outside of said vehicle than said front lower cover, in the vehicle width direction.

6. The saddle-type vehicle according to claim 5, wherein a fuel tank is disposed at a side of said crankcase, in the vehicle width direction.

7. The saddle-type vehicle according to claim 1, wherein a fuel tank is disposed at a side of said crankcase, in the vehicle width direction.

8. The saddle-type vehicle according to claim 2, wherein a fuel tank is disposed at a side of said crankcase, in the vehicle width direction.

9. The saddle-type vehicle according to claim 1, wherein the upper side surface extends in a direction having a first inclination angle relative to a longitudinal direction of the vehicle, wherein the lower side surface extends in a direction having a second inclination angle relative to the longitudinal direction of the vehicle, and wherein the second inclination angle is greater than the first inclination angle.

* * * * *